INVENTOR.
MICHEL LACOURREGE
BY Bauer and Seymour
ATTORNEYS

United States Patent Office 3,682,666
Patented Aug. 8, 1972

3,682,666
BATCH MATERIAL FOR VITREOUS
MANUFACTURES
Michel Lacourrege, Neuilly-sur-Seine, France, assignor
to Saint-Gobain, Neuilly-sur-Seine, France
Continuation-in-part of application Ser. No. 621,284,
Mar. 7, 1967. This application Jan. 21, 1971, Ser.
No. 108,362
Claims priority, application France, Mar. 9, 1966,
52,685
Int. Cl. C03b 1/00; C03c 3/04
U.S. Cl. 106—52                                              18 Claims

ABSTRACT OF THE DISCLOSURE

A novel method for manufacturing a prereacted glass material is disclosed. A free flowing, granular pre-product consisting in discrete grains of silica coated with complex alkali metal-alkaline earth metal silicates in a substantially crystallized state is obtained by heating part of the batch ingredients essential to the constitution of the glass with a few percent of certain halides at a temperature lower than 787° C.

---

This application is a continuation-in-part of Ser. No. 621,284, filed Mar. 7, 1967, now abandoned, and is entitled to its priority and to that of French application PV 52,685, filed Mar. 9, 1966, in France.

This invention relates to the manufacture of glass and other complex silicates and in particular to the manufacture of new products which can be used for manufacturing glass. It also relates to the process for manufacturing these new products. It also comprises apparatus by which the new product may be manufactured.

It has already been suggested to feed glass melting furnaces, at least partially, with various prereacted materials containing a part of the constituents of the glass; for instance it has been proposed to introduce sodium oxide and in some cases alkaline earth oxides and oxide of magnesium as more or less complex pre-molten silicates.

It has also been proposed to heat the materials of the glass batch to a temperature and during a time sufficient to achieve a chemical reaction between some of the glass constituents, while the batch as a whole remains constantly in a solid state. In that method the batch is heated to about 820°.

Those methods have not apparently entered industrial practice. The reason is that the results are not always quite satisfactory either because the gain obtained during the melting of the glass is eliminated, in particular by the time necessary to sufficiently complete the chemical reaction during the manufacture of the prereaction material, or because the prereacted material obtained cannot be easily vitrified in the glass melting furnaces because of its physical or chemical condition, or for both of these reasons. It is further known that the decarbonatation of sodium carbonate and its reaction with silica to obtain silicates can be substantially accelerated if "activators" such as alkaline halides are added; the reaction can then be entirely and rapidly completed in solid phase.

The object of the invention is to prepare a prereacted material which constitutes an improved starting batch material for the manufacture of glass. Another object is to prepare a prereacted batch material comprising most and preferably all the constituents of the glass such as alkalimetal and alkaline earth compounds, oxides of magnesium and aluminum, together with the silica and the sodium oxide.

A further object is to produce the new material in a free flowing granular form adapted to the manufacture of glass in a tank furnace.

Another object of the invention is to manufacture the prereacted batch material in a turning kiln furnace by a continuous process.

The objects of the invention are accomplished, generally speaking, by treating a mixture of sand, sodium carbonate, limestone and sometimes other materials, such as for example feldspar, dolomite, etc., at a temperature which is comprised between about 600° C. and about 787° C. in the presence of one or several activating salts selected from among the salts giving with sodium carbonate a eutectic melting at a temperature comprised between 600° C. and 787° C.

I have discovered that, provided the temperature is not raised above 787° C. as long as a substantial amount of carbonate is still present in the batch mixture, this batch will preserve throughout the reaction the granulated character of sand and, not withstanding this relatively low temperature, the speed of the decarbonatation reaction in the presence of the activating mineral salts added to the batch, is such that the "pre-glass" of the invention can be obtained in a time compatible with an industrial operation, that is to say, in from about 30 to 60 minutes.

The pre-glass, manufactured by the process of the invention is obtained as a free flowing powder, the granulometry of which is substantially the same as that of sand. The products obtained are constituted by grains of silica coated with complex alkali metal-alkaline earth metal silicates, usually in crystalline state. When the granulation of the alkaline earth carbonates introduced into the batch is sufficiently low, the alkaline earth oxides will be completely combined to form a complex silicate in the prereacted batch.

The decarbonated prereacted batch material is completely inert to water vapor and carbon dioxide at any temperature.

Any mineral salt or any mixture of such salts answering to the definition can be used in the invention, provided this or these salts can be later eliminated from the glass, or will have no undesirable effect on the characteristics of the final glass.

It will readily be understood that many salts or mixtures of such salts can be used to activate the reaction, the selection of which will depend on the further treatment and of the properties of the glass to be produced.

Practically the most advantageous activating salts are alkali metal halides and more particularly sodium chloride. Other halides, such as aluminum or alkaline earth halides, can also be used; these salts can be considered as equivalent to alkali metal halides because when the batch is heated the reaction between the halides introduced in the batch and sodium carbonate will yield sodium halide.

Sodium sulfate alone will not activate the reactions. This salt can, however, advantageously be used in combination with other activating salts, such as those herein above enumerated, the temperature range in which the reaction proceeds at a sufficient speed being further lowered when sodium sulfate is added to another activating salt.

Generally speaking, the activating salt of the invention makes it possible to conduct the decarbonatation reaction at a temperature substantially lower than 787° C., while the speed of the reaction remains sufficiently high for an industrial process. When the batch is heated without an activating salt, to prereact the components by the methods previously suggested, the batch must be heated to a temperature notably higher than 787° C., and in fact to about 850°, in order that the reaction proceed at an acceptable speed. At such temperatures the components of the batch will unavoidably stick together even if powerful agitating means are used. The sintering of the batch into a solid mass can be explained in the following way: Kracek's diagram of the $SiO_2$—$Na_2O$ system shows the existence of a eutectic melting at 793° and containing 73.9% by weight of $SiO_2$ and 26.1% of $Na_2O$. This mixture, which can be considered as formed of two molecules of $SiO_2$—$Na_2O$ and one molecule of $SiO_2$, is extremely viscous in the vicinity of its melting point. When grains of sand are heated with sodium carbonate, bridges of a very viscous silicate, having approximately the composition of this eutectic, appear in the contact zones between the grains of batch materials. The grains will therefore have a tendency to stick together. But when the reaction proceeds further, the viscous silicate will deviate from the eutectic composition and will be transformed into a solid silicate. As a result, the grains of the batch will be truly welded together and the batch sintered to form a solid mass.

If, in order to avoid the sintering of the batch containing sand and sodium carbonate, the temperature is kept lower than the melting point of the eutectic, the contacts between the grains will be strictly limited to solid-solid contact and therefore, as the temperature is lowered, the speed of the reaction becomes too slow to be acceptable for industrial application.

In other words, in the absence of the activating salts of the invention, the reaction is too slow when the temperature is maintained under about 793°, while if the temperature is raised above 793°, the batch will sinter into a solid mass and therefore the temperature rise, far from speeding up the reaction, will freeze it, or at least the exchange of matter throughout the mass will be considerably diminished.

When the batch contains other materials, such as calcium and magnesium carbonates, several other viscous eutectic salts melting at lower temperatures can be formed when the batch is heated. Apparently, viscous molten products begin to appear when the temperature of the batch reaches about 787° C. In order to avoid the sintering of the batch, the temperature must be maintained lower than 787° C. and this temperature constitutes the upper limit of the temperature range in which the process of the invention can be practiced.

When a batch, to which activating salts have been added, is heated, the eutectics which are formed melt at temperatures lower than 787° C. These eutectic mixtures are not viscous and the liquid droplets of the eutectic mixture which appear when the batch is heated constitute an excellent wetting agent which carries the sodium carbonate throughout the batch into contact with the sand grains.

The batch remains constantly fluent while the carbonates are disseminated throughout the batch. Ordinary agitating means can be utilized to mix up the batch during the reaction. As the temperature to which the batch is heated is relatively low, although the reaction proceeds at an acceptable speed, the cost of the operation is considerably lowered.

As the activating salts are constantly regenerated during the reaction, the amount of such salts necessary to activate the reaction is small. Favorable results are obtained when 1% in weight of activating salts, calculated relatively to the total weight and sand+sodium carbonate, is utilized.

I have tried to explain by theory the results I have obtained, but the invention is not subordinated to the exactness of the theory.

I have further noticed that the hydracid is not to be found in the gases above the batch, during the reaction. This would apparently confirm my theory that the activating halides act by a physical process instead of taking part in a chemical reaction.

The present invention can also be useful when the sodium carbonate of the batch is replaced partially or totally, by sodium hydroxide. When a batch containing sodium hydroxide is heated, sodium hydroxide will be immediately transformed into sodium carbonate by the action of the carbon dioxide present in the atmosphere of the reactor and by a reaction between sodium hydroxide and limestone:

$$CaCO_3 + 2NaOH \rightarrow Na_2CO_3 + Ca(OH)_2$$

Several factors can affect the reactions which occur when the batch is prereacted, such as the amount of carbon dioxide and of water vapor in the atmosphere of the reactor.

INFLUENCE OF CARBON DIOXIDE

When a glass batch, containing sand, limestone and sodium carbonate, is progressively heated, the pace of the reaction is strongly influenced by the amount of carbon dioxide present in the atmosphere of the reactor. Laboratory experiences have shown that when the temperature is progressively raised, the limestone will be decarbonated before the sodium carbonate. Free calcium oxide is therefore formed. It is known that the decarbonatation reaction of limestone is controlled by the partial pressure of carbon dioxide in the atmosphere.

If this same batch but to which 1 to 2% of an activating salt has been added, is heated in the same way, not only are all decarbonatation reactions strongly accelerated but all decarbonatation reactions occur more or less simultaneously. Thus as soon as calcium oxide is formed by the decarbonatation of the limestone, it is immediately transformed into a complex silicate of sodium and calcium. The sensitivity of the system to the amount of carbon dioxide present in the atmosphere of the reactor is slight. I have thus, for example, been able to prepare a prereacted glass batch by heating a batch to 750° in an atmosphere containing as much as 85% of carbon dioxide.

INFLUENCE OF WATER VAPOR

I have observed that when the batch is prereacted in an atmosphere containing water vapor, the speed of the reactions is increased. I have further observed that the amount of water vapor normally present in combustion gases, such as those produced by the combustion of ordinary heating gas, is quite sufficient. While the further introduction of water in the gaseous mixture is not harmful, it is not truly technically advantageous. On the contrary, if the amount of water vapor is too slight, the speed of the reaction will be lowered. Therefore, if the reactor is heated by electricity or indirectly, it will be quite advantageous to introduce a slight amount of water vapor into the atmosphere within the reactor.

My invention further resides in the novel construction, combination and arrangements of parts which will be more fully described hereafter and claimed in the appended claims, and illustrated in the drawings in which:

Figure 1:
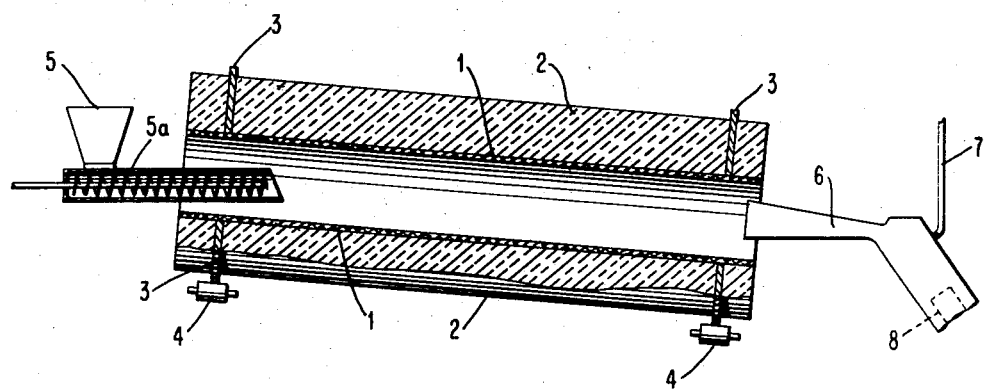
FIG. 1 is a schematic view of a rotating kiln wherein the batch is heated by combustion gases.

As seen in FIG. 1, the reactor is a tube 1 of refractory steel covered with heat insulation 2. Tube 1 can be rotated on rings 3 on rollers 4. The batch materials are introduced through hopper 5 and screw 5a. Tube 1 is slightly tilted from the horizontal so that the batch materials are carried across the reactor when the tube is rotated. Combustion products from burner 8, diluted at 6 with cold air introduced through pipe 7, are directed through tube 1 to heat the batch.

If necessary, additional water vapor is introduced either through a special pipe (not shown) or more simply through pipe 7 together with the air of dilution.

Figure 2:
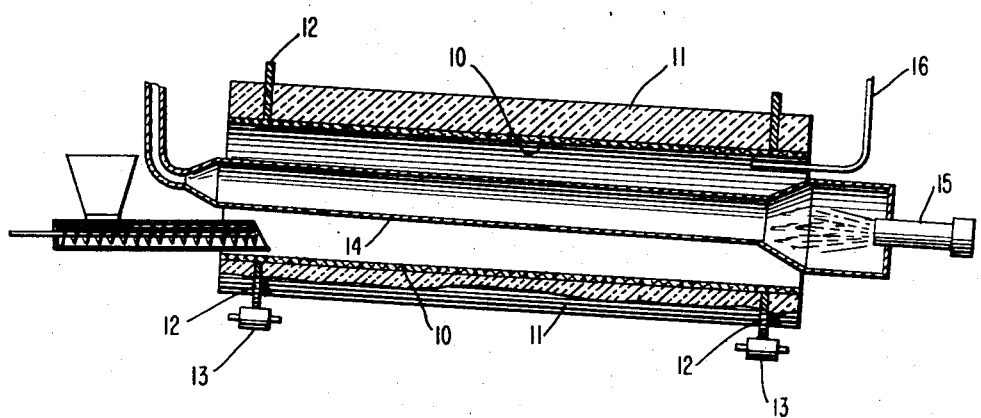
FIG. 2 is a view of another embodiment wherein the kiln is indirectly heated.

The reactor of FIG. 2 is heated indirectly. Tubular reactor 10 made of refractory steel is heat insulated by a padding 11 and rotates on rolling rings 12 and rollers 13. The batch is heated by tube 14, extending axially inside tube 10, containing a high speed current of combustion gases from burner 15.

In the apparatus of FIG. 2 the atmosphere of the reactor is notably poorer in $CO_2$ than in the case of FIG. 1. This atmosphere is also poorer in water and therefore it is advantageous to introduce water vapor through pipe 16. The combustion gases are still at a high temperature at their exit from pipe 14 but this heat can be recuperated in order to preserve a satisfactory heat balance for the whole installation. Because of the high speed of the gaseous current in tube 14, the zone of the reactor maintained during the reaction at an homogeneous temperature is important and more so than in the reactor shown in FIG. 1. The production of the reactor is hereby increased.

The invention is illustrated by the following examples. It is, however, to be understood that the invention is in no way to be limited to the specific embodiments hereafter described, many different variations being easily conceivable by a skilled specialist while remaining within the scope of my invention.

Example 1

A tubular reactor was used. The length of the tube was 4 m. and its diameter 0.15 m. The temperature within the batch (measured in the center part of the tube where it is most homogeneous) was $700 \pm 10°$ C. A glass batch made of sand, sodium carbonate, limestone and dolomite was compounded in such proportions that $SiO_2/Na_2O=5.3$. Sodium chloride (1% by weight of the batch) was introduced into this batch. The speed of the reactor was maintained at 6 revolutions per minute. A mixture of combustion gases and of cold air at a temperature of about 740° was introduced into the reactor through pipe 6. The flow rate of hot gases was, once the temperature within the reactor became stabilized, 11.5 m.³ per hour.

The batch materials remained in the reactor for about 50 minutes.

10 kg. per hour of decarbonated prereacted material are obtained. The prereacted product is essentially composed of sodocalcic silicates and of sand. The decarbonation rate is comprised between 90 and 95% (100% corresponding to a complete decarbonatation of the product).

Example 2

To a rotary furnace 4 m. long and 0.5 m. in diameter there are introduced a mixture of sand, limestone, dolomite, and sodium carbonate in proportions producing a product having the following relationship after the release of $CO_2$:

$SiO_2$—5.25 moles, CaO—0.86 mole, MgO—0.33 mole, $Al_2O_3$—0.04 mole, $Na_2O$—0.8 mole. In this product the ratio $Na_2O/CaO$ is 0.93.

This product becomes 95% decarbonated after about 30 minutes residence in the furnace when a very small addition of $Na_2O$ is made, for example under the form of caustic soda, and produces plate glass of the composition:

$SiO_2$—5.25 moles, CaO—0.86 mole, MgO—0.33 mole, $Al_2O_3$—0.04 mole, $Na_2O$—1.00 mole.

The same formula produces a good window glass by adding some MgO during fusion.

The glasses of this example are less rich in $Na_2O$ than glasses of the type of Example 1, in which the ratio $Na_2O/CaO$ is 1.6, for window glass. As this indicates a composition having less $Na_2O$ than is usually found in window glass, the shortage of $Na_2O$ can be supplied as lye at the moment of the introduction of a decarbonated, prereacted material into the melting furnace. Such a procedure has substantial advantages: A prereacted material in which the $Na_2O/CaO$ ratio is between 0.5 and 1.2 does not harden in the part of the melting zone which is at 600°–787° C., which is the temperature of the process of this invention, or even at higher temperatures such as 850°–860° C. to which the prereacted decarbonated material may be raised, after the reaction, in the downstream part of the rotary furnace to improve the structure and the strength of the grains. Also the regulation and operation of the rotary furnace are rendered more certain and predictable.

Following these principles a concentrated pre-glass containing all the alkaline earth oxides and all the alumina of the final glass but containing only a part of the sand and a part of the $Na_2O$ is prepared in advance, the final glass being formed from it by the addition during fusion of the remainder of sand and caustic soda necessary to the final composition of the glass.

Example 3

A pre-glass is formed as in Examples 1 and 2, of the molar composition $SiO_2$—2 moles, CaO—0.86 mole, MgO—0.33 mole, $Al_2O_3$—0.04 mole, $Na_2O$—0.53 mole. The temperature in the rotary reactor is below 787° C. in the upstream part of the rotary tube but is raised to 850° to 860° C. after the reactions of Example 1 have taken place. To this preglass will be added before the introduction into the glass melting furnace the sand and caustic soda necessary to bring the glass composition up to $SiO_2$—5.25 moles, CaO—0.86 mole, MgO—0.33 mole, $Al_2O_3$—0.04 mole, $Na_2O$—1.0 mole.

In order to determine the influence of different factors on the reactions, the operating conditions have been modified to study the effects of the following factors: The nature of the activating salt; the amount of activating salt; and the influence of the presence of water vapor and carbon dioxide in the atmosphere of the reactor.

The granulometry of the batch products was of about 160 microns, which corresponds to the average granulometry of sand. The decarbonatation reaction will be somewhat intensified if finer batch materials are used (grain size: 40–50 microns) as will be shown later for the alkaline earth carbonates.

(1) Effect of the introduction of sodium chloride. The glass batch was composed of sand, sodium carbonate and limestone in amounts corresponding to an ordinary silica-sodalime glass and in this batch $SiO_2/CO_3$—total=2.8.

The average temperature was 720° and the batch material remained in the reactor for 30 minutes. The composition of the gaseous mixture introduced into the reactor was: 20 volumes $N_2$, 2 volumes $CO_2$, 7 volumes $H_2O$ (vapor). This mixture corresponds to combustion products of ordinary heating gas.

When a glass batch to which no activating salts have been added, is heated under those conditions, the decarbonation rate is only 7%, while the decarbonation rate of a batch containing, of sodium chloride, 5% of the weight of sodium carbonate, is heated under the same conditions, is about 70%.

(2) Effect of water vapor.—The general conditions of the test were as above. The amount of sodium chloride added to the batch was 5% of the weight of sodium carbonate, which corresponds to 1% of the weight of the whole batch.

When the atmosphere above the batch was made of a mixture of 27 volumes $N_2$ and 2 volumes $CO_2$ the decarbonatation rate was 47%, while with an atmosphere made of 20 volumes $N_2$, 2 volumes $CO_2$ and 7 volumes $H_2O$ (vapor) this rate was about 70%.

(3) Effect of carbon dioxide.—The batch during the following tests was heated at 700° C. for 60 minutes. The amount of sodium chloride introduced in the batch was the same as above. The composition of the atmosphere above the batch was modified. The decarbonatation rate was 92% when the composition of the atmosphere during the test was 22 volumes $N_2$ and 7 volumes $H_2O$ (vapor); 64% for an atmosphere made of a mixture of 20 volumes $N_2$, 2 volumes $CO_2$, and 7 volumes $H_2O$ (vapor); and 57% for an atmosphere of 24 volumes $CO_2$ and 5 volumes $H_2O$ (vapor).

Although the reaction is somewhat slower when the atmosphere over the batch contains carbon dioxide, the character of the speed decrease thus produced is completely different from what happens when a batch containing no activating salt is heated during an extended period of time. On one hand the decrease is much less important in the case of the batch of the invention, and on the other hand the decrease in speed is nearly the same whether 85% or 7% of $CO_2$ are present in the atmosphere above the batch.

(4) Nature of the activating salts.—The composition of the glass batch was the same as above. Different mineral salts in various amounts were introduced into the batch and the batches thus obtained were heated progressively so that the temperature was raised from 600° to 750° C. in 20 minutes. A sample of the pre-reacted product was gathered when the temperature reached 750° C. and analyzed to determine the decarbonation rate.

The hot gases heating the reactor had the following composition: 20 volumes $N_2$, 2 volumes $CO_2$, 7 volumes $H_2O$ (vapor). The results of those tests are given in the table below:

| Activating salt | Percent activator | Decarbonation rate, percent |
|---|---|---|
| Without | 0 | 26 |
| $B_2O_3$ | 1.5 | 44 |
| NaCl | 1 | 92 |
| NaCl | 2 | 97 |
| NaF plus $CaCl_2$ | 0.6+0.6 | 97 |
| $CaCl_2$ | 2 | 98 |
| Cryolite | 2 | 90 |
| Sodium fluoride | 2 | 87 |
| $Na_2SO_4$ | 2 | 29 |
| $Na_2SO_4$ plus NaCl | 2 | 93 |

It can be seen that chlorides constitute particularly advantageous activating salts. Sodium sulfate alone will not activate the reactions but when mixed with sodium chloride, it will have a quite favorable action on the decarbonatation reaction.

(5) Granulometry of the alkaline earth carbonates.—The reactor used was in the form of a rotating tube having a length of 6 m. and a diameter of 0.40 m. The batch to which 1.5 to 2% of NaCl were added, was heated from 600° C. to 750° C. in about 15 minutes by a hot gaseous current the composition of which was: 20 volumes $N_2$, 2 volumes $CO_2$, 7 volumes $H_2O$ (vapor). The feed rate of the batch was of 120 kg./hr.

If the granulometry of the alkaline earth carbonates is comprised between 1 and 2 mm., part of the alkaline earth oxides will be, in the final product, found in an uncombined state, the more as the average granulometry is higher.

If, under the same conditions, the alkaline earth carbonates are introduced in grains the average dimension of which is of the order of 1 mm. and preferably smaller, as for example of the same dimensions as the sand the grains of which have between 100 and 150 microns, the prereacted product obtained does not contain any free alkaline earth oxides such as calcium oxide. All these oxides are combined in the complex silicates and cannot react with the humidity and the carbon dioxide in the air. The raw product is therefore more resistant to the action of atmospherical agents and easier to manipulate and to use.

The pre-glass of this invention contains complex sodium-calcium-silicates in crystalline form, of which a major part has an empirical composition of $3SiO_2$, CaO, $Na_2O$.

It is advantageous to reduce the amount of $CO_2$ present in the atmosphere above the reactants and, for this purpose, a gaseous combustible low in carbon can be burned and the products of combustion used to sweep away the gases arising from the reaction. Hydrogen, methane and natural gas are illustrative of fuels low in carbon.

As many apparently widely different embodiments of the present invention may be made without departing from the spirit and scope thereof, it is to be understood that the invention is not limited to the specific embodiments.

What is claimed is:

1. A free flowing, granular starting material for the manufacture of glass consisting in discrete grains of silica coated with complex alkali metal-alkaline earth metal silicates in a substantially crystallized state.

2. The material of claim 1 wherein the complex silicates are silicates of sodium and calcium.

3. A process for manufacturing a granular starting material for the manufacture of glass which comprises intermixing in a reactor solid grains of silica, of alkaline earth carbonates, of sodium carbonate, and a halide salt of one of the group Na, K, Ca, Ba, Al in a proportion which forms with the sodium carbonate a eutectic melting below about 787° C., and heating the mixture at a temperature between 600° C. and about 787° C. for about 30 to 60 minutes, and recovering the product as solid, discrete particles.

4. The method of claim 3 in which the halide is sodium chloride.

5. A method of making a free flowing, granular starting material useful in the melting of complex silicates such as glass which comprises mixing sand, sodium and calcum carbonates, and a halide from the class of alkali metal, alkaline earth, and aluminum halides in proportions which produce a eutectic melting below 787° C. upon heating, heating the mixture with agitation between about 600° and 787° C., and cooling the product.

6. The method of claim 5 in which an alkali metal sulfate is present in the mixture.

7. The method of claim 5 and introducing water vapor in the atmosphere above the heated mixture.

8. The method of claim 5 in which the said halides in the mixture constitute about 1 to 2% of the weight of the sand and sodium carbonate therein.

9. The method of claim 5 in which the mixture contains sodium hydroxide in part or total replacement of the sodium carbonate.

10. The method of claim 5 in which the reaction is carried out in an atmosphere containing about 20 volumes of nitrogen, about 2 volumes of $CO_2$, and about 7 volumes of water vapor.

11. The method of claim 5 in which the halide comprises sodium chloride.

12. The method of claim 5 in which the halide comprises sodium fluoride.

13. The method of claim 5 in which the halide comprises calcium chloride.

14. The method of claim 5 in which the granulometry of the alkaline earth carbonates in the mixture is about 1 to 2 mm.

15. A method of making a glass melting material which consists in compounding a batch containing at least sand, sodium and calcium carbonates and a fluoride or chloride salt from the class of alkali metal, alkaline earth, and aluminum fluorides and chlorides giving with sodium carbonate an eutectic the melting point of which is lower than 787° C., feeding said batch into a rotating tubular kiln and heating said batch within said kiln to a temperature comprised between about 600° C. and 787° C.

16. The method of claim 15 and directing through said kiln a current of hot combustion gases from low carbon fuel diluted with cold air.

17. The method of claim 15 wherein the batch is heated indirectly, water vapor being injected into the atmosphere within the kiln.

18. A method according to claim 15 in which the raw materials introduced to the reactor have a ratio $Na_2O/CaO$ between 0.5 and 1.2.

References Cited
UNITED STATES PATENTS

| | | | |
|---|---|---|---|
| 3,503,790 | 3/1970 | Gringras | 106—52 |
| 3,529,979 | 9/1970 | Yarsa | 106—52 |

TOBIAS E. LEVOW, Primary Examiner

M. L. BELL, Assistant Examiner

U.S. Cl. X.R.

117—100 S; 65—21, 134